(12) United States Patent
Toqan et al.

(10) Patent No.: US 9,052,114 B1
(45) Date of Patent: Jun. 9, 2015

(54) TANGENTIAL ANNULAR COMBUSTOR WITH PREMIXED FUEL AND AIR FOR USE ON GAS TURBINE ENGINES

(76) Inventors: Majed Toqan, Abu Dhabi (AE); Brent Allan Gregory, Scottsdale, AZ (US); Jonathan David Regele, Fountain Hills, AZ (US); Ryan Sadao Yamane, Gilbert, AZ (US)

( * ) Notice: Subject to any disclaimer, the term of this patent is extended or adjusted under 35 U.S.C. 154(b) by 998 days.

(21) Appl. No.: 12/771,338

(22) Filed: Apr. 30, 2010

Related U.S. Application Data

(60) Provisional application No. 61/174,298, filed on Apr. 30, 2009.

(51) Int. Cl.
| | | |
|---|---|---|
| *F23R 3/28* | (2006.01) | |
| *F23R 3/58* | (2006.01) | |
| *F23R 3/34* | (2006.01) | |
| *F23R 3/04* | (2006.01) | |

(52) U.S. Cl.
CPC ....... *F23R 3/286* (2013.01); *F23R 2900/00015* (2013.01); *F23R 3/58* (2013.01); *F23R 3/346* (2013.01); *F23R 3/04* (2013.01)

(58) Field of Classification Search
CPC ............ F23R 3/346; F23R 3/286; F23R 3/04; F23R 3/58; F23R 2900/00015
USPC .............................. 60/733, 753, 759, 804, 737
See application file for complete search history.

(56) References Cited

U.S. PATENT DOCUMENTS

| | | | | | |
|---|---|---|---|---|---|
| 2,851,853 | A | * | 9/1958 | Quick | 60/262 |
| 3,880,575 | A | * | 4/1975 | Cross et al. | 431/353 |
| 3,910,036 | A | * | 10/1975 | Irwin | 60/753 |
| 3,981,142 | A | * | 9/1976 | Irwin | 60/753 |
| 4,098,075 | A | * | 7/1978 | Greenberg et al. | 60/804 |
| 4,912,931 | A | * | 4/1990 | Joshi et al. | 60/732 |
| 4,928,481 | A | * | 5/1990 | Joshi et al. | 60/737 |
| 4,938,020 | A | * | 7/1990 | Shekleton et al. | 60/39.26 |
| 5,113,647 | A | * | 5/1992 | Shekleton | 60/804 |
| 5,177,956 | A | * | 1/1993 | Shekleton | 60/804 |
| 5,261,224 | A | * | 11/1993 | Shekleton et al. | 60/804 |
| 5,319,935 | A | * | 6/1994 | Toon et al. | 60/733 |
| 5,581,998 | A | * | 12/1996 | Craig | 60/800 |
| 5,746,048 | A | * | 5/1998 | Shah | 60/776 |
| 6,931,862 | B2 | * | 8/2005 | Harris | 60/804 |
| 7,716,931 | B2 | * | 5/2010 | Mancini et al. | 60/748 |
| 7,836,677 | B2 | * | 11/2010 | Bland | 60/39.37 |
| 2011/0209482 | A1 | * | 9/2011 | Toqan et al. | 60/804 |

* cited by examiner

*Primary Examiner* — William H Rodriguez
*Assistant Examiner* — Carlos A Rivera
(74) *Attorney, Agent, or Firm* — Michael W. Goltry; Robert A. Parsons; Parsons & Goltry

(57) ABSTRACT

A combustion device used in gas turbine engines to produce propulsion or rotate a shaft for power generation includes an annular combustor with a system of fuel and air inlet passages and nozzles that results in a staged combustion of premixed fuel and air. The fuel and air inlets are placed at various longitudinal locations circumferentially, and can take on different configurations where all nozzles inject a fuel-air mixture or some may inject only air. The combustion device provides an optimal mixing of fuel and air, creates an environment for combustion that reduces pollutant emissions reducing the need for costly pollution control devices, enhances ignition and flame stability, reduces piloting issues, allows increased fuel flexibility, decreases the required size of the first stage nozzle guide vane (NGV), and improves vibration reduction.

2 Claims, 6 Drawing Sheets

TANGENTIAL ANNULAR COMBUSTOR WITH PREMIXED FUEL AND AIR FOR USE ON GAS TURBINE ENGINES

CROSS-REFERENCE TO RELATED APPLICATION

This application claims the benefit of U.S. Provisional Patent Application Ser. No. 61/174,298, filed Apr. 30, 2009.

FIELD OF THE INVENTION

This invention relates to devices in gas turbine engines that aid in containing and producing the combustion of a fuel and air mixture. Such devices include but are not limited to fuel-air nozzles, combustor liners and casings and flow transition pieces that are used in military and commercial aircraft, power generation, and other gas turbine related applications.

BACKGROUND OF THE INVENTION

Gas turbine engines include machinery that extracts work from combustion gases flowing at very high temperatures, pressures and velocity. The extracted work can be used to drive a generator for power generation, drive compression devices or for providing the required thrust for an aircraft. A typical gas turbine engine consists of multistage compressor where the atmospheric air is compressed to high pressures. The compressed air is then mixed at a specified fuel/air ratio in a combustor wherein its temperature is increased. The high temperature and pressure combustion gases are then expanded through a turbine to extract work so as to provide the required thrust or drive a generator depending on the application. The turbine includes at least a single stage with each stage consisting of a row of blades and a row of vanes. The blades are circumferentially distributed on a rotating hub with the height of each blade covering the hot gas flow path. Each stage of non-rotating vanes is placed circumferentially, which also extends across the hot gas flow path. The included invention involves the combustor of gas turbine engines and components that introduce the fuel and air into the said device.

The combustor portion of a gas turbine engine can be of several different types: silo, can/tubular, annular, and a combination of the last two forming a can-annular combustor. It is through this component that the compressed fuel-air mixture passes through fuel-air swirlers and a combustion reaction of the mixture takes place, creating a hot gas flow causing it to drop in density and accelerate downstream. The can type combustor typically comprises of individual, circumferentially spaced cans that contain the flame of each nozzle separately. Flow from each can is then directed through a duct and combined in an annular transition piece before it enters the first stage NGV. In the annular combustor type, fuel-air nozzles are typically distributed circumferentially and introduce the mixture into a single annular chamber where combustion takes place. Flow simply exits the downstream end of the annulus into the first stage turbine, without the need for a transition piece. The key difference of the last type, a can-annular combustor, is that it has individual cans encompassed by an annular casing that contains the air being fed into each can. Each variation has its benefits and disadvantages, depending on the application.

In combustors for gas turbines, it is typical for the fuel-air nozzle to introduce a swirl to the mixture for several reasons. One is to enhance mixing and thus combustion, another reason is that adding swirl stabilizes the flame to prevent flame blow out and it allows for leaner fuel-air mixtures for reduced emissions. A fuel air nozzle can take on different configurations such as single to multiple annular inlets with swirling vanes on each one. As with other gas turbine components, implementation of cooling methods to prevent melting of the combustor material is needed. A typical method for cooling the combustor is effusion cooling, implemented by surrounding the combustion liner with an additional, offset liner, which between the two, compressor discharge air passes through and enters the hot gas flow path through dilution holes and cooling passages. This technique removes heat from the component as well as forms a thin boundary layer film of cool air between the liner and the combusting gases, preventing heat transfer to the liner. The dilution holes serve two purposes depending on its axial position on the liner: a dilution hole closer to the fuel-air nozzles will aid in the mixing of the gases to enhance combustion as well as provide unburned air for combustion, second, a hole that is placed closer to the turbine will cool the hot gas flow and can be designed to manipulate the combustor outlet temperature profile.

One can see that several methods and technologies can be incorporated into the design of combustors for gas turbine engines to improve combustion and lower emissions. While gas turbines tend to produce less pollution than other power generation methods, there is still room for improvement in this area. With government regulation of emissions tightening in several countries, the technology will need to improve to meet these requirements.

SUMMARY OF THE INVENTION

With regard to present invention, there is provided a novel and improved combustor design that is capable of operating in a typical fashion while minimizing the pollutant emissions that are a result of combustion of a fuel and air mixture. The invention consists of a typical annular combustor with pre-mixed fuel-air nozzles and/or dilution holes that introduce the compressor discharge air and pressurized fuel into the combustor at various locations in the longitudinal and circumferential directions. The original feature of the invention is that the fuel and air inlets are placed in such a way as to create an environment with enhanced mixing of combustion reactants and products. Staging the premixed fuel and air nozzles to have more fuel upstream from another set of downstream nozzles enhances the mixing of the combustion reactants and creates a specific oxygen concentration in the combustion region that greatly reduces the production of NOx. In addition, the introduction of compressor discharge air downstream of the combustion region allows for any CO produced during combustion to be burned/consumed before entering the first stage turbine. In effect, the combustor will improve gas turbine emission levels, thus reducing the need for emission control devices as well as minimize the environmental impact of such devices. In addition to this improvement, the tangentially firing fuel and fuel-air nozzles directs its flames to the adjacent burner, greatly enhancing the ignition process of the combustor and the resulting flow exiting the combustor has a significant circumferential velocity component that reduces the required size of the first stage NGV.

BRIEF DESCRIPTION OF THE DRAWINGS

Referring to the drawings.

DETAILED DESCRIPTION

Figure 1:
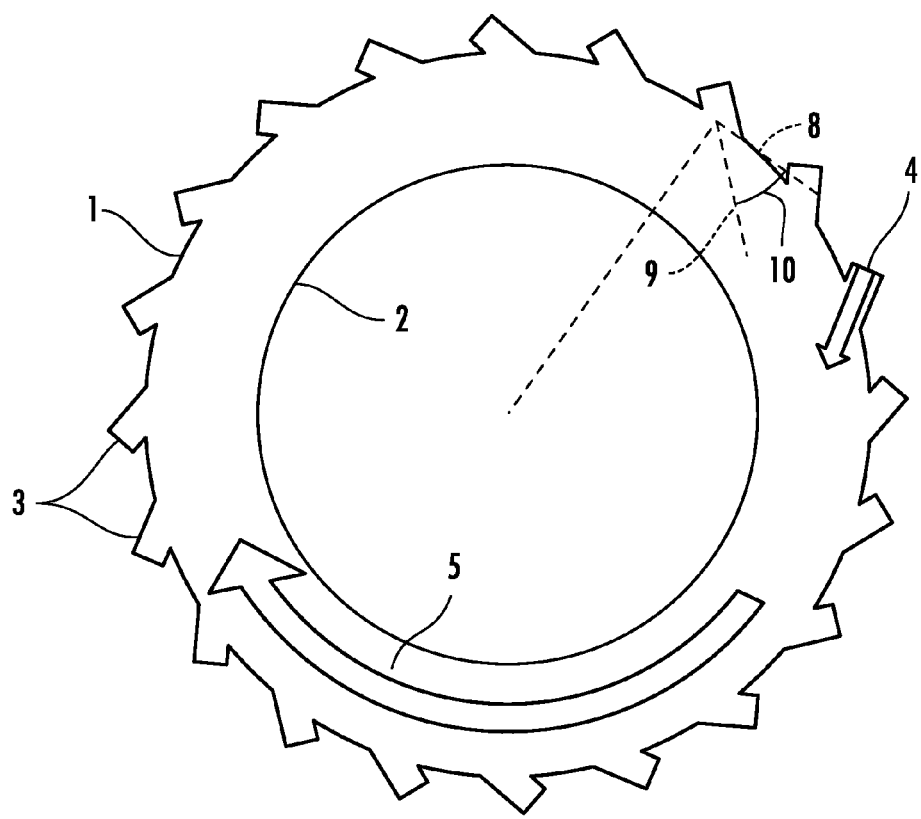
FIG. 1 is a two-dimensional sketch showing the nozzles that attach to the outer combustor liner and have a circumferential and radial direction into the combustor (possible longitudinal direction of the nozzle not shown)
Figure 6:
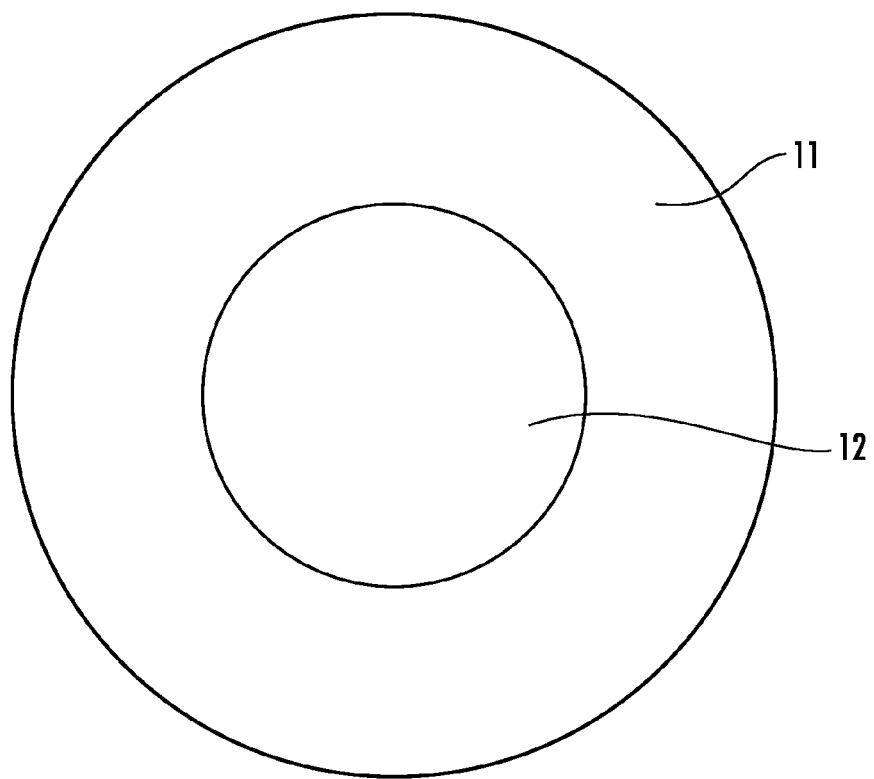
FIG. 6 is a two dimensional diagram showing a generic nozzle cross section layout of the fuel-air nozzles.

FIG. 1 shows the general premise of an annular combustor with tangentially directed fuel-air nozzles. The combustor is composed of an outer shell (or liner) 1, an inner shell (or liner) 2, both of which can have a constant or varying radius in the longitudinal direction, and a front wall 6 that connects the inner and outer liners 1, 2. As seen in the FIG., an example configuration of the invention shows premixed fuel-air nozzles 3 pointing mainly in a circumferential direction, where the angle 10 is formed between a line 8 tangent to the outer liner and the nozzle 3 centerlines 9, but may have a radial or longitudinal component to its direction. These various nozzles 3 may share a common plane defined by the longitudinal direction and a point along the engine centerline and may be equally spaced circumferentially or have pattern to the spacing in this direction. The nozzles introduce a premixed fuel-air mixture 4 into the combustor volume created by the inner and outer shell 1, 2 and the front wall 6. The reactants that are injected by the fuel and air nozzles 3 combust within this region and create a flow field 5 through the combustor that rotates about the engine centerline. The said nozzles through which fuel, air, or premixed fuel and air pass through take on the general layout as seen in FIG. 6. A circular region 12 coaxial to the nozzle encompasses a region which may hold an axial swirler and/or pilot fuel/air nozzles. The concentric annular flow passage 11 may impart little to no swirl on the air or premixed fuel-air mixture that is passing through. A minimal if any amount of swirl is introduced to the flow through the annular passage in order to maintain a significant tangential velocity that enters the combustor. This configuration allows for the flow to keep a maximum circumferential velocity component at the combustor exit, which reduces the required $1^{st}$ stage turbine vane length.

Figure 2:
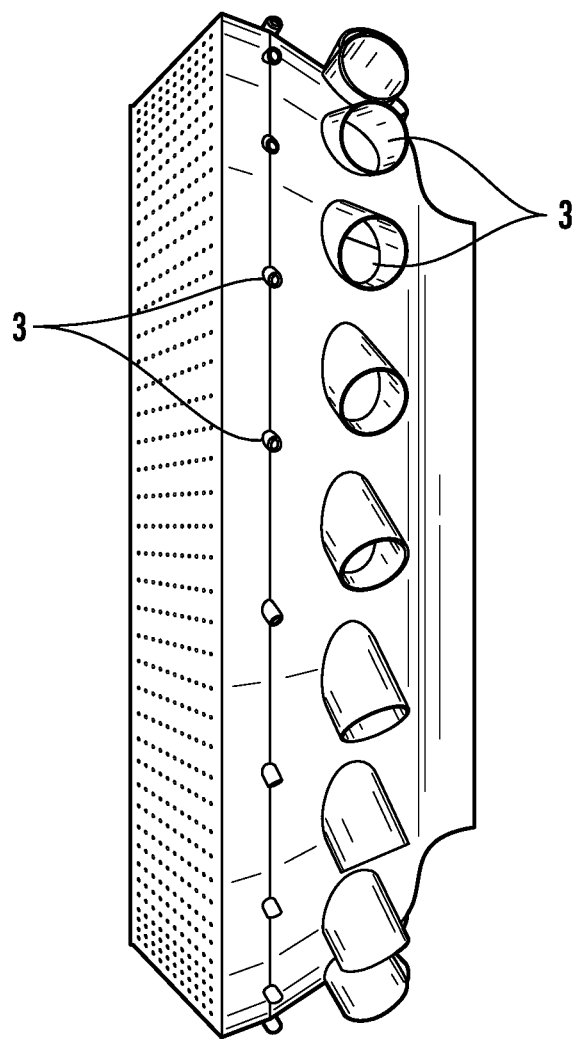
FIG. 2 is an isometric side view of an example annular combustor with the proposed staged fuel and air injection.
Figure 3:
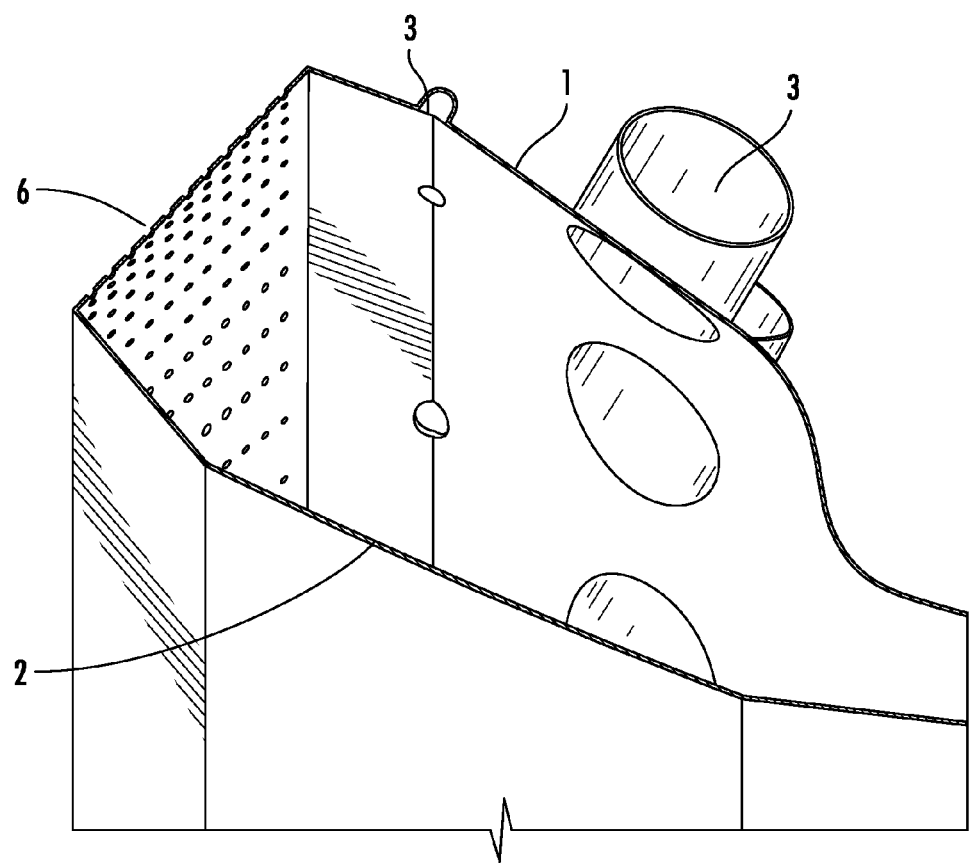
FIG. 3 is an isometric section view with the cutting plane defined by the engine centerline and a radius.
Figure 4B:
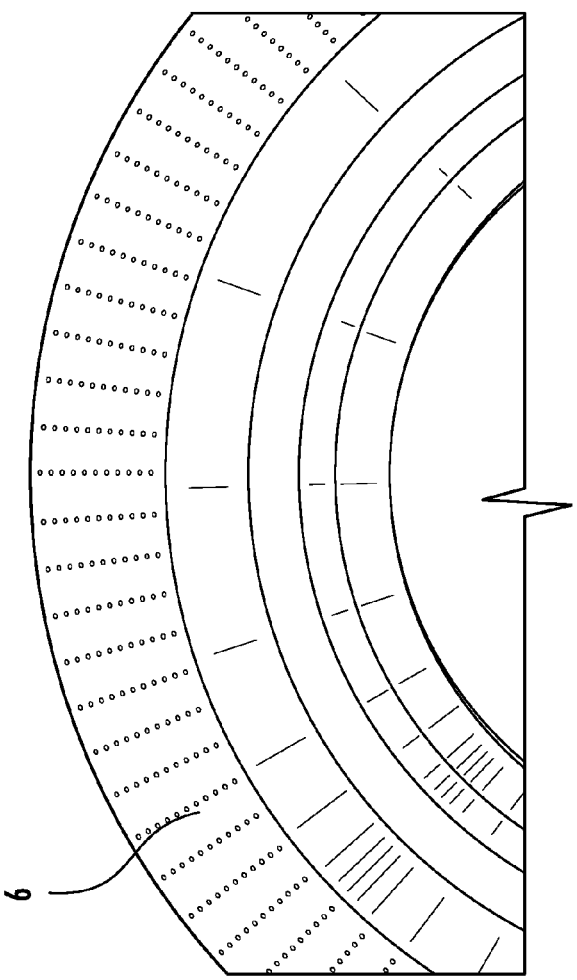
FIG. 4B is a close up view of the image from FIG. 4A.
Figure 4A:
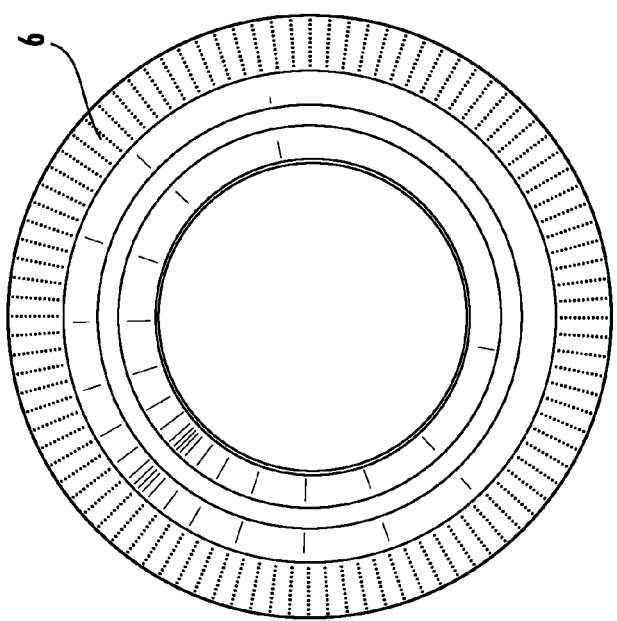
FIG. 4A is an isometric side view looking forward to aft that shows the front wall and the perforated front wall that the said invention may have.
Figure 5B:
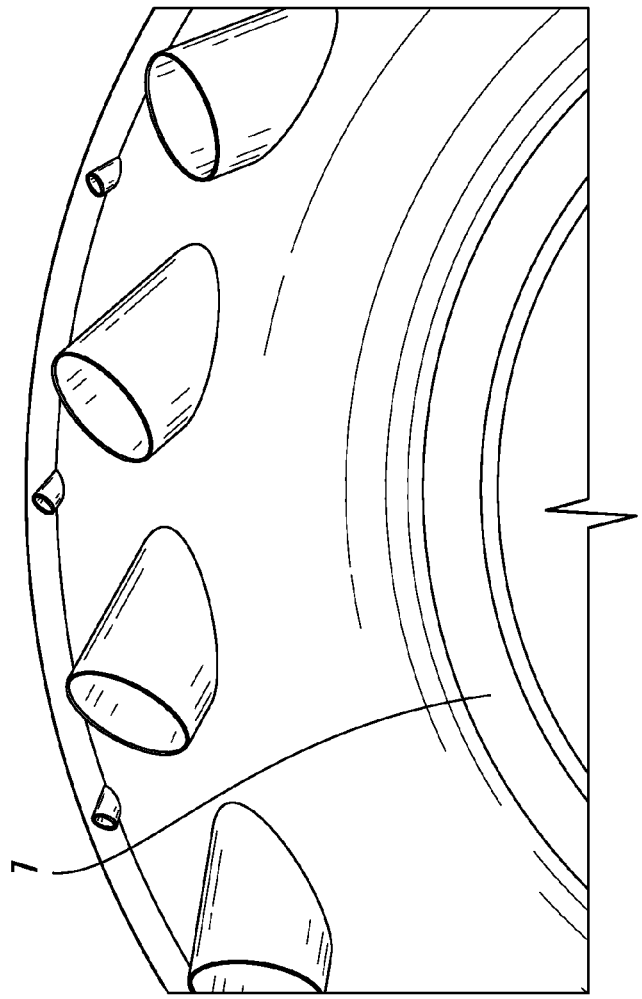
FIG. 5B is a close up view of the image from FIG. 5A.
Figure 5A:
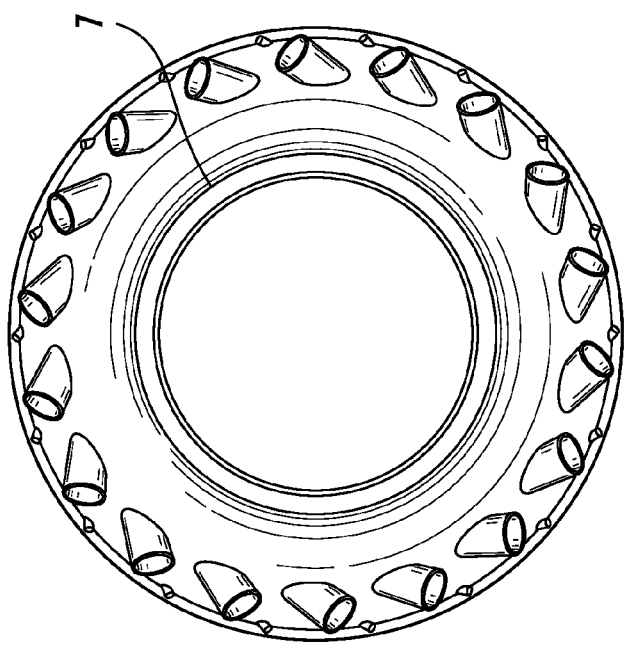
FIG. 5A is an isometric front view of the example combustor from an aft to front perspective that shows the outlet and inlet nozzles.

FIG. 2 shows an example configuration for the invention where fuel nozzles 3 are placed upstream (to the left) of a second set of fuel-air nozzles that share a common plane and are circumferentially spaced. The number of fuel nozzles 3 may be at least one, and up to an unlimited amount. Compressor discharge air may also be introduced to the combustor volume through a perforated front wall 6 as seen in FIGS. 3, 4A and 4B. The injection of the mixture through the first row nozzles that are near the front wall, which may have a higher fuel/air ratio than the second set of nozzles in conjunction with the mixture that is injected downstream of the fuel nozzles 3, creates the desired mixing and fuel-air staging effect that will create an optimal combustion environment that reduces NOx and CO emissions from the combustor at part load and/or full load conditions. The hot combustion products then exit the combustor through an annular opening 7 as seen in FIGS. 5A and 5B where it enters the first stage turbine of the gas turbine.

The present invention is described above with reference to a preferred embodiment. However, those skilled in the art will recognize that changes and modifications may be made in the described embodiment without departing from the nature and scope of the present invention. Various changes and modifications to the embodiment herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A method of mixing combustion reactants for combustion for a gas turbine engine consisting of the steps of:
   providing a combustor, the combustor includes:
      an outer shell, an inner shell, and a perforated front wall that connects the outer shell to the inner shell so as to form an annular volume arranged about a centerline of the combustor, and an annular discharge opening opposite to the front wall arranged about the centerline of the combustor;
      circumferentially spaced first nozzles in the outer shell between the front wall and the annular discharge opening, only the circumferentially spaced first nozzles reside in a first plane that is normal to a longitudinal direction of the annular volume; and
      circumferentially spaced second nozzles in the outer shell between the circumferentially spaced first nozzles and the front wall, only the circumferentially spaced second nozzles reside in a second plane that is normal to the longitudinal direction of the annular volume;
   concurrently:
   injecting a first pre-mixed fuel-air mixture into the annular volume through all of the circumferentially spaced first nozzles residing in the first plane, the circumferentially spaced first nozzles each applying the first pre-mixed fuel-air mixture into the annular volume in a direction that is angularly offset from a tangent line relative to the outer shell forming a flow field through the annular volume rotating about the centerline of the combustor, the flow field flowing through the annular volume in a direction from the perforated front wall to the annular discharge opening;
   injecting a second pre-mixed fuel-air mixture into the flow field through the annular volume through all of the circumferentially spaced second nozzles residing in the second plane, the circumferentially spaced second nozzles each applying the second pre-mixed fuel-air mixture into the annular volume in the direction that is angularly offset from the tangent line relative to the outer shell; and
   injecting compressor discharge air through the perforated front wall into the flow field through the annular volume;
   the concurrent steps of injecting a first pre-mixed fuel-air mixture into the annular volume through all of the circumferentially spaced first nozzles residing in the first plane, injecting a second pre-mixed fuel-air mixture into the flow field through the annular volume through all of the circumferentially spaced second nozzles residing in the second plane, and injecting compressor discharge air through the perforated front wall into the flow field through the annular volume creating fuel-air staging for enhancing combustion and reducing NOx and CO emissions.

2. The method according to claim 1, in which the first pre-mixed fuel-air mixture has a first fuel-air ratio, the second pre-mixed fuel-air mixture has a second fuel-air ratio, and the first fuel-air ratio is greater than the second fuel-air ratio.

* * * * *